US009976636B2

(12) United States Patent
Prokup et al.

(10) Patent No.: US 9,976,636 B2
(45) Date of Patent: May 22, 2018

(54) LOCKING MECHANISMS FOR RAM AIR TURBINES

(71) Applicant: Hamilton Sundstrand Corporation, Charlotte, NC (US)

(72) Inventors: Christopher S. Prokup, Carpentersville, IL (US); David G. Bannon, Rockford, IL (US); Mark A. Osborn, Cherry Valley, IL (US); Gregory J. Bradley, Cherry Valley, IL (US); William E. Seidel, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days. days.

(21) Appl. No.: 14/692,800

(22) Filed: Apr. 22, 2015

(65) Prior Publication Data

US 2016/0312865 A1  Oct. 27, 2016

(51) Int. Cl.
| G05G 5/06 | (2006.01) |
| F16H 21/06 | (2006.01) |
| F16H 21/44 | (2006.01) |
| B64D 41/00 | (2006.01) |

(52) U.S. Cl.
CPC ............. *F16H 21/06* (2013.01); *F16H 21/44* (2013.01); *B64D 41/007* (2013.01)

(58) Field of Classification Search
CPC ............................... F16H 21/06; B29C 45/681
USPC .......................................................... 74/527
See application file for complete search history.

(56) References Cited

U.S. PATENT DOCUMENTS

| 3,579,742 | A | * | 5/1971 | Muttart | ................. | B29C 45/681 425/151 |
| 6,036,238 | A | * | 3/2000 | Lallament | .............. | B64D 29/06 292/100 |
| 6,189,832 | B1 | * | 2/2001 | Jackson | .................... | B64C 7/02 244/129.4 |
| 6,629,712 | B2 | * | 10/2003 | Jackson | ................. | B64D 29/02 244/129.4 |
| 2012/0297924 | A1 | * | 11/2012 | Lang | .................... | B64D 41/007 74/99 R |
| 2012/0328436 | A1 | * | 12/2012 | Soidel | ................... | B64D 41/007 416/47 |
| 2013/0330121 | A1 | * | 12/2013 | Sasscer | ................ | B64D 41/007 403/322.4 |

(Continued)

*Primary Examiner* — Vicky A Johnson
(74) *Attorney, Agent, or Firm* — Locke Lord LLP; Daniel J. Fiorello; Scott D. Wofsy

(57) ABSTRACT

A locking mechanism for a ram air turbine (RAT) includes a base clevis configured to mount to a housing and to have a base link clevis connector portion defining a plurality of base link clevis connector arms and a base link clevis having a base connector portion defining base connector arms that are configure to movably connect to the base link clevis connector arm. The locking mechanism also includes a pin operatively connecting the base connector portion to the base link clevis connector portion in a rotatable relationship and a spring positioned around the pin, wherein a first spring end abuts the base clevis and a second spring end abuts the base link clevis to bias the base link clevis to an unlocked position. A sleeve is positioned between the spring and the pin to maintain a wind diameter of the spring.

11 Claims, 4 Drawing Sheets

(56) References Cited

U.S. PATENT DOCUMENTS

2015/0232195 A1* 8/2015 Bannon ................ B64D 41/007
                                                            92/15

* cited by examiner

LOCKING MECHANISMS FOR RAM AIR TURBINES

BACKGROUND

1. Field

The present disclosure relates to ram air turbines, more specifically to actuator and locking assemblies for ram air turbines.

2. Description of Related Art

Traditional ram air turbine (RAT) locking mechanisms include a base clevis for fixing to a housing and a pair of link devises that attach the base clevis to a sliding clevis in a 3-bar linkage. The sliding clevis is fixed to a lock piston that is configured to slide between a locked position and an unlocked position within the RAT assembly.

A pin holding the base link clevis to the base clevis includes a torsional spring disposed directly thereon for providing a biasing actuation force toward the unlocked position. Instabilities and/or force translation issues associated with the torsional spring exist in this configuration. Additionally, base clevis alignment holes for mounting on the housing can have imperfections that force a friction fit between a corresponding alignment feature on the housing which is undesired as it can also affect force translation to the lock piston.

Such conventional methods and systems have generally been considered satisfactory for their intended purpose. However, there is still a need in the art for improved RAT locking mechanisms. The present disclosure provides a solution for this need.

SUMMARY

A locking mechanism for a ram air turbine (RAT) includes a base clevis configured to mount to a housing and to have a base link clevis connector portion defining a plurality of base link clevis connector arms and a base link clevis having a base connector portion defining base connector arms that are configure to movably connect to the base link clevis connector arm. The locking mechanism also includes a pin operatively connecting the base connector portion to the base link clevis connector portion in a rotatable relationship and a spring positioned around the pin, wherein a first spring end abuts the base clevis and a second spring end abuts the base link clevis to bias the base link clevis to an unlocked position. A sleeve is positioned between the spring and the pin to maintain a wind diameter of the spring.

The sleeve can be at least as long as the length of a total wind of the spring. The sleeve can be as long as a length of pin within the base link clevis connecter arms or the base connector arms. For example, the sleeve can be a cylindrically shaped member. In certain embodiments, the sleeve can have chamfered ends.

The base clevis can include at least one slotted aperture for receiving an alignment feature of the housing. The locking mechanism can further include a piston link operatively connected to the base link clevis and a sliding clevis operatively connected to the piston link, wherein the sliding clevis is configured to connect to a lock piston.

In certain embodiments, a locking mechanism for a RAT can include a base clevis configured to mount to a housing and to have a base link clevis connector portion defining a plurality of base link clevis connector arms, wherein the base clevis includes at least one slotted aperture for receiving an alignment feature of the housing. The base clevis can include chamfered edges.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
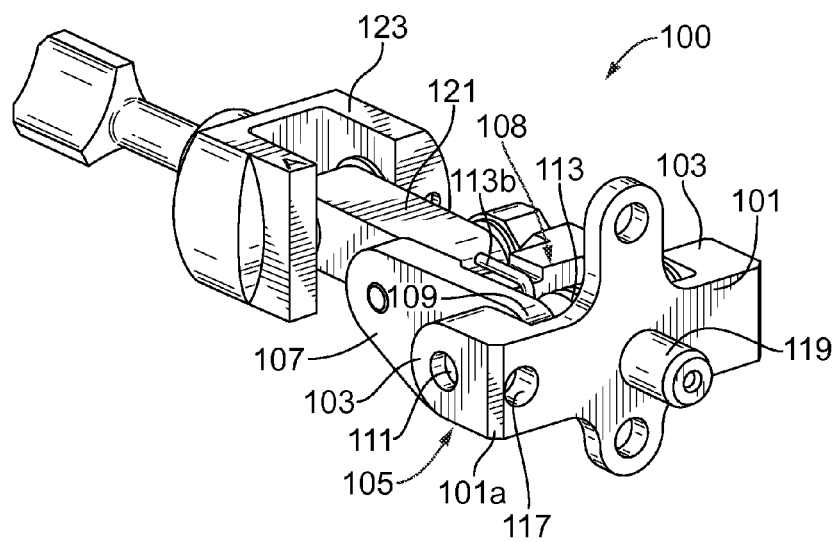
FIG. 1 is a perspective view of an embodiment of a locking mechanism in accordance with this disclosure.

Reference will now be made to the drawings wherein like reference numerals identify similar structural features or aspects of the subject disclosure. For purposes of explanation and illustration, and not limitation, an illustrative view of an embodiment of a locking mechanism in accordance with the disclosure is shown in FIG. 1 and is designated generally by reference character 100. Other embodiments and/or aspects of this disclosure are shown in FIGS. 2-7B. The systems and methods described herein can be used to improve the response of locking mechanisms in ram air turbines.

Figure 7A:
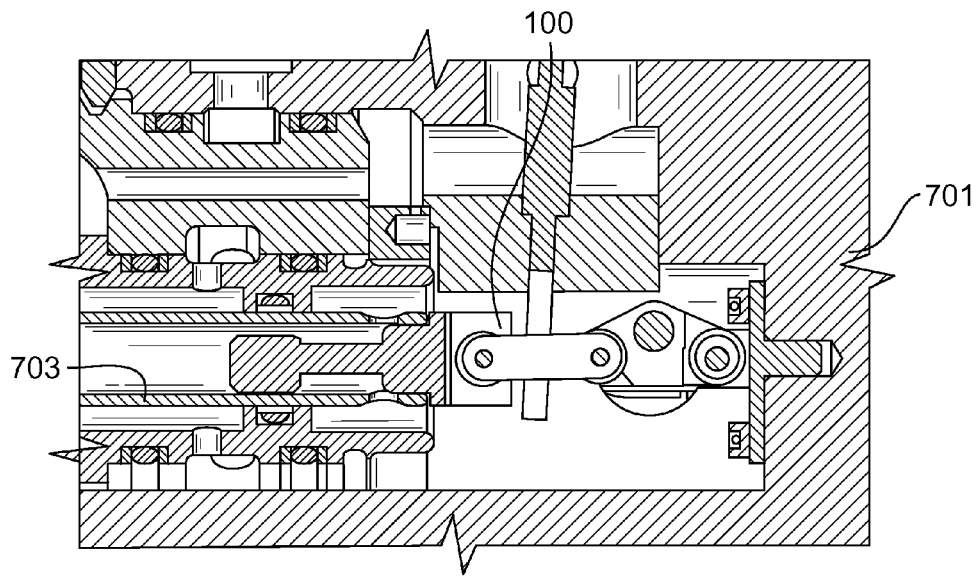
FIG. 7A is a schematic view of the locking mechanism of FIG. 1 disposed in a ram air turbine (RAT) housing, showing the locking mechanism in a locked position.
Figure 7B:
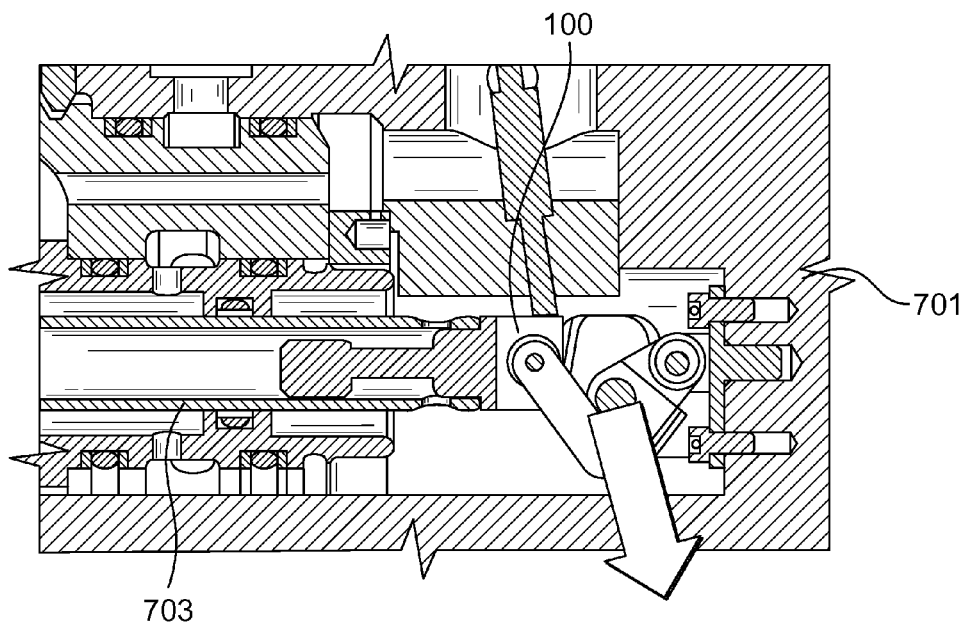
FIG. 7B is a schematic view of the locking mechanism of FIG. 1 disposed in a ram air turbine (RAT) housing, showing the locking mechanism in an unlocked position.

Referring to FIGS. 1-4, a locking mechanism 100 for a ram air turbine (RAT) includes a base clevis 101 configured to mount to a housing (e.g., housing 701 shown in FIGS. 7A and 7B). The base clevis 101 is configured to have a base link clevis connector portion defining a plurality of base link clevis connector arms 103. The base clevis 101 can include one or more chamfered edges 101a to facilitate insertion into a housing.

The locking mechanism 100 further includes a base link clevis 107 having a base connector portion 108 defining base connector arms 109 that are configure to movably connect to the base link clevis connector arms 103. The locking mechanism 100 also includes a pin 111 operatively connecting the base connector portion 105 to the base link clevis connector portion 105 in a rotatable relationship.

Figure 2:
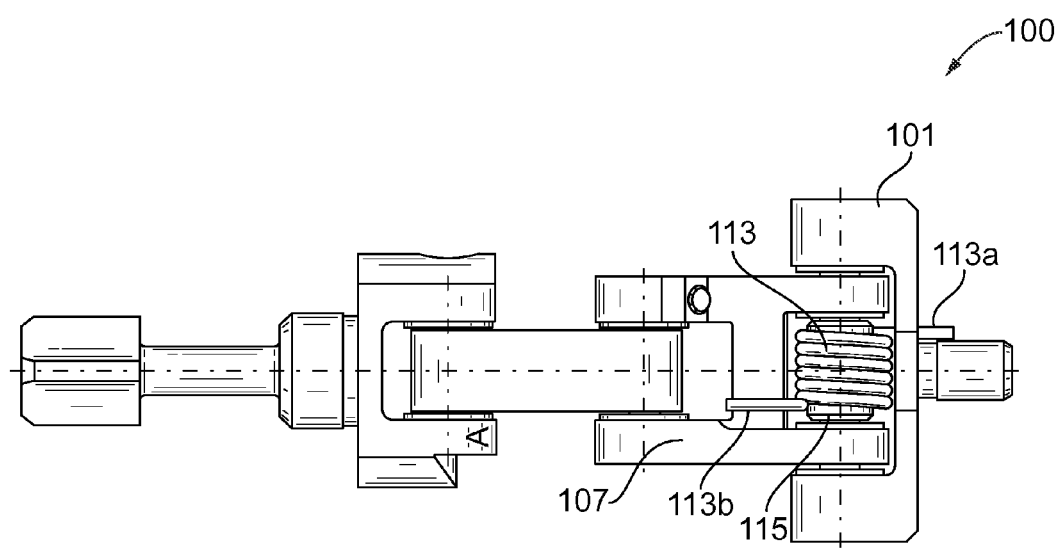
FIG. 2 is a plan view of the locking mechanism of FIG. 1, showing the spring member disposed therein.

As shown in FIG. 2, a spring 113 is positioned around the pin 111 such that a first spring end 113a abuts the base clevis 101 and a second spring end 113b abuts the base link clevis 107 to bias the base link clevis 107 to an unlocked position (e.g., as shown in FIG. 7B). The spring 113 can be of any suitable size and include any suitable number of winds.

Figure 3:
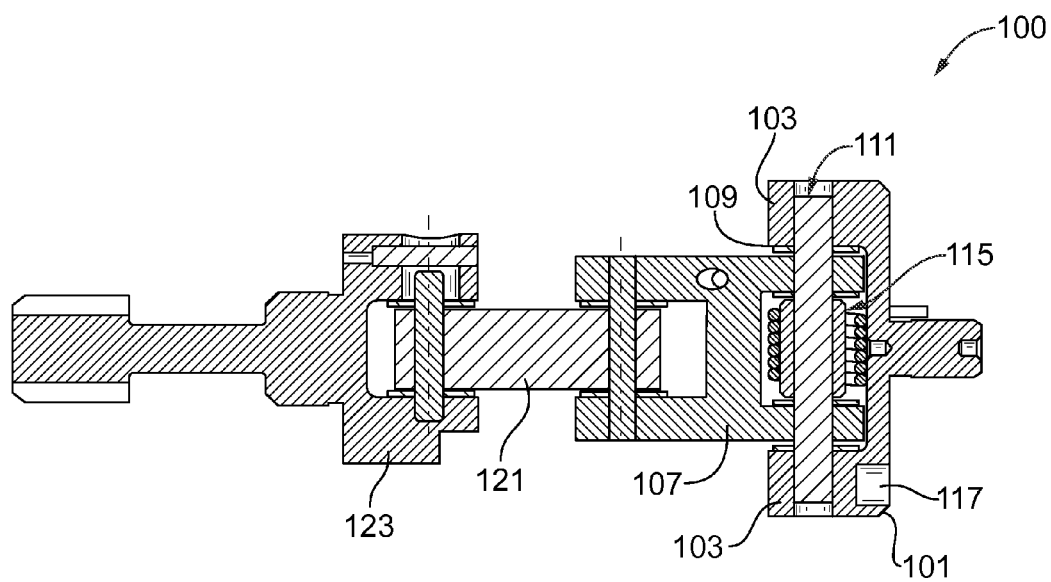
FIG. 3 is a cross-sectional view of the locking mechanism of FIG. 1, showing a sleeve disposed between the spring and the pin.
Figure 4:
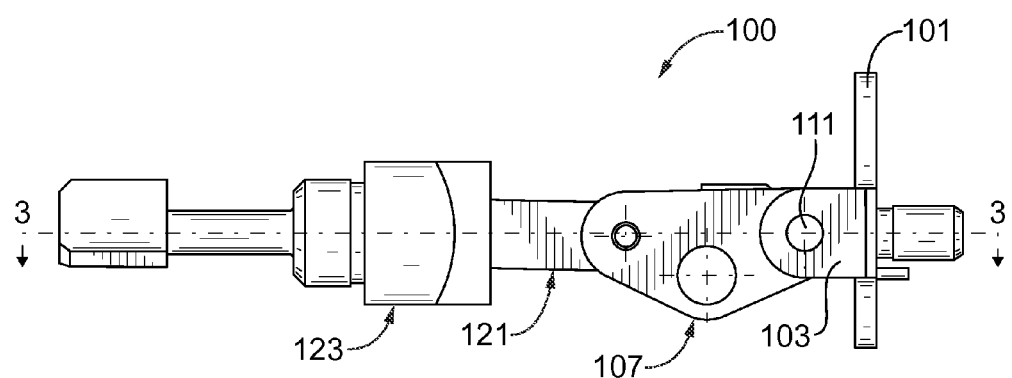
FIG. 4 is a side elevation view of the locking mechanism of FIG. 1, showing the pin joints of the various components.

In certain embodiments, a sleeve 115 can be positioned between the spring 113 and the pin 111 to maintain a wind diameter of the spring 113. As shown in FIG. 3, the sleeve 115 can be at least as long as the length of a total wind of the spring 113. For example, the sleeve 115 can be as long as a length of pin 111 within the base link clevis connecter arms 103 or the base connector arms 109.

Figure 5:
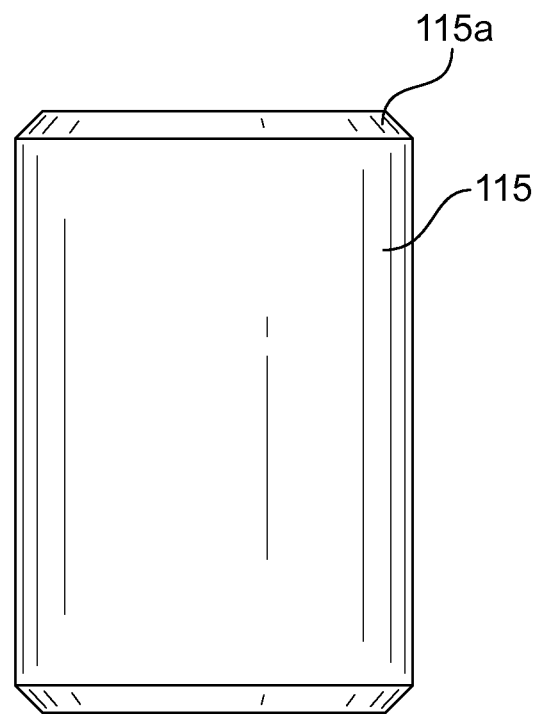
FIG. 5 is a side elevation view of an embodiment of a sleeve in accordance with this disclosure, showing chamfered ends thereof.

As shown in FIG. 5, the sleeve 115 can be a cylindrically shaped member. In certain embodiments, the sleeve 115 can have one or more chamfered ends 115a. The sleeve 115 can be made of a metal, plastic, and/or any other suitable material. Any other suitable shape or configuration of the sleeve 115 is contemplated herein.

Figure 6:
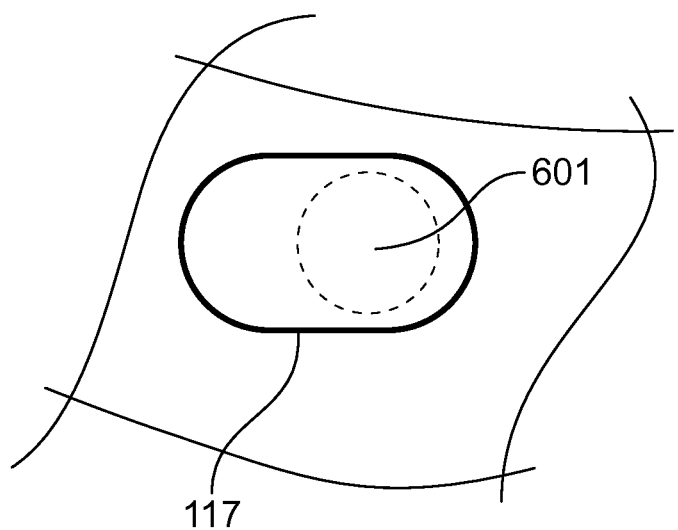
FIG. 6 is a schematic view of an embodiment of the slotted aperture on the base clevis of the locking mechanism in accordance with this disclosure.

Referring to FIGS. 1, 3, and 6, the base clevis 101 can include at least one slotted aperture 117 for receiving an alignment feature 601 of the housing. Slotted aperture 117 allows insertion of alignment feature 601 even where there is imperfection in the positioning of the alignment feature on the housing without causing a friction fit or allowing transverse motion of the base clevis 101 relative to the housing (e.g., about mounting post 119).

The locking mechanism 100 can further include a piston link 121 operatively connected to the base link clevis 107 and a sliding clevis 123 operatively connected to the piston link 121. The sliding clevis 123 is configured to connect to a lock piston (e.g., piston 703 as shown in FIGS. 7A and 7B).

Referring to FIG. 7A, when a solenoid toggle is in an on state, the locking mechanism is shown attached to a RAT housing 701 and in the locking position such that the lock piston 703 is extended (to the left in FIG. 7A) and blocks locking pawls (not shown) from disengaging a RAT actuator. Referring to FIG. 7B, when a solenoid toggle switches to the off state, the spring 113 biases the base link clevis 107 down which pulls on piston link 121, which in turn pulls on sliding link 123. This motion disengages the locking pawls from the RAT actuator and allows the RAT to deploy. The sleeve 113 and/or the slotted aperture 117 and/or the chamfered edges 101a improve the stability of the locking mechanism 100 and enhance the force translation from the spring 113 to the locking piston 703.

The methods and systems of the present disclosure, as described above and shown in the drawings, provide for improved locking mechanisms with superior properties including enhanced stability and force translation. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A locking mechanism for a ram air turbine (RAT), comprising:
   a base clevis configured to mount to a housing and to have a base link clevis connector portion defining a plurality of base link clevis connector arms, wherein the base clevis includes at least one slotted aperture for receiving an alignment feature of the housing, wherein the at least one slotted aperture is defined in the base clevis to face the housing;
   a base link clevis having a base connector portion defining a plurality of base connector arms that are configured to movably connect to the base link clevis connector arms;
   a pin operatively connecting the base connector portion to the base link clevis connector portion in a rotatable relationship;
   a spring positioned around the pin, wherein a first spring end abuts the base clevis and a second spring end abuts the base link clevis to bias the base link clevis to an unlocked position; and
   a sleeve positioned between the spring and the pin to maintain a wind diameter of the spring, wherein the sleeve is configured to improve the stability of the locking mechanism and enhance the force translation from the spring to the locking piston;
   a piston link operatively connected to the base link clevis; and
   a sliding clevis operatively connected to the piston link, wherein the sliding clevis is configured to connect to a lock piston which moves linearly in an axial direction of actuation, wherein the at least one slotted aperture opens in an axial direction of actuation of the lock piston such that the slotted aperture is configured to receive the alignment feature of the housing that extends in the axial direction of actuation, wherein the slotted aperture is slotted in a direction transverse to the axial direction of actuation.

2. The locking mechanism of claim 1, wherein the sleeve is at least as long as the length of a total wind of the spring.

3. The locking mechanism of claim 2, wherein the sleeve is as long as a length of pin within the base link clevis connecter arms or the base connector arms.

4. The locking mechanism of claim 1, wherein the sleeve is a cylindrically shaped member.

5. The locking mechanism of claim 4, wherein the sleeve includes chamfered ends.

6. A locking mechanism for a ram air turbine (RAT), comprising:
   a base clevis configured to mount to a housing and to have a base link clevis connector portion defining a plurality of base link clevis connector arms, wherein the base clevis includes at least one slotted aperture for receiving an alignment feature of the housing, wherein the at least one slotted aperture is defined in the base clevis to face the housing, wherein the at least one slotted aperture opens in an axial direction of actuation of a lock piston of the locking mechanism, wherein the lock piston moves linearly in an axial direction of actuation such that the slotted aperture is configured to receive the alignment feature of the housing that extends in the axial direction of actuation, wherein the slotted aperture is slotted in a direction transverse to the axial direction of actuation.

7. The locking mechanism of claim 6, wherein the base clevis includes chamfered edges.

8. The locking mechanism of claim 6, further comprising:
   a base link clevis having a base connector portion defining a plurality of base connector arms that are configure to movably connect to the base link clevis connector arms;
   a pin operatively connecting the base connector portion to the base link clevis connector portion in a rotatable relationship;
   a spring positioned around the pin, wherein a first spring end abuts the base clevis and a second spring end abuts the base link clevis to bias the base link clevis to an unlocked position; and a sleeve positioned between the spring and the pin to maintain a wind diameter of the spring, wherein the sleeve is at least as long as the length of a total wind of the spring.

9. The locking mechanism of claim 8, wherein the sleeve is as long as a length of pin within the base link clevis connecter arms or the base connector arms.

10. The locking mechanism of claim 8, wherein the sleeve is a cylindrically shaped member.

11. The locking mechanism of claim 10, wherein the sleeve includes chamfered ends.

* * * * *